United States Patent [19]
McCullough, Jr. et al.

[11] 3,840,246
[45] Oct. 8, 1974

[54] CRASH PROTECTION BAG AND INFLATION EQUIPMENT AND COMPONENTS THEREOF

[75] Inventors: Foy McCullough, Jr., Bellevue; Duane A. Williams, Mercer Island; Lincoln B. Katter, Lynnwood; Donald R. Poole, Woodinville, all of Wash.

[73] Assignee: Rocket Research Corporation, Redmond, Wash.

[22] Filed: Mar. 30, 1970

[21] Appl. No.: 23,735

[52] U.S. Cl. .......... 280/150 AB, 102/39, 137/525.3
[51] Int. Cl. ............................................. B60r 21/10
[58] Field of Search ............... 280/150 AB; 102/39; 89/1 R; 52/2; 137/525.3; 244/31; 116/124

[56] References Cited
UNITED STATES PATENTS

| | | | |
|---|---|---|---|
| 1,370,178 | 3/1921 | Albert | 137/525.3 X |
| 2,418,798 | 4/1947 | Whitmer | 280/150 X |
| 2,974,912 | 3/1961 | Namsick | 244/138 |
| 3,251,566 | 5/1966 | Chappell | 244/31 |
| 3,276,726 | 10/1966 | Thole et al | 244/31 |
| 3,279,419 | 10/1966 | Demarco | 116/124 |
| 3,312,427 | 4/1967 | Yost | 244/31 |
| 3,316,719 | 5/1967 | Loprete | 102/39 |
| 3,425,712 | 2/1969 | Berryman | 280/150 |
| 3,430,979 | 3/1969 | Terry et al. | 280/150 |
| 3,450,414 | 6/1969 | Kobari | 280/150 |
| 3,451,694 | 6/1969 | Hass | 280/150 |
| 3,469,805 | 9/1969 | Craig et al. | 244/31 |
| 3,508,724 | 4/1970 | Scher et al. | 244/31 |
| 3,560,018 | 2/1971 | Goetz | 280/150 |
| 3,624,810 | 11/1971 | Hass | 280/150 AB |

*Primary Examiner*—Kenneth H. Betts
*Attorney, Agent, or Firm*—Graybeal, Barnard, Uhlir & Hughes

[57] ABSTRACT

An inflatable bag is located in a vehicle forwardly of an occupant. Solid propellant thrusters or thrusters powered by a stored or generated fluid are used for deploying the bag. Ambient air may be admitted into the bag during inflation, through either openings in the bag wall or openings in a vehicle wall to which the bag is secured. In either case the openings are provided with check valves for preventing or at least decreasing outward flow of the inflation fluid from the bag.

12 Claims, 13 Drawing Figures

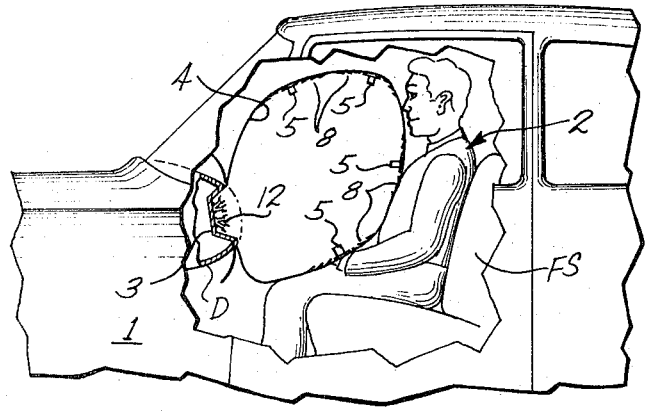
Fig. 1.
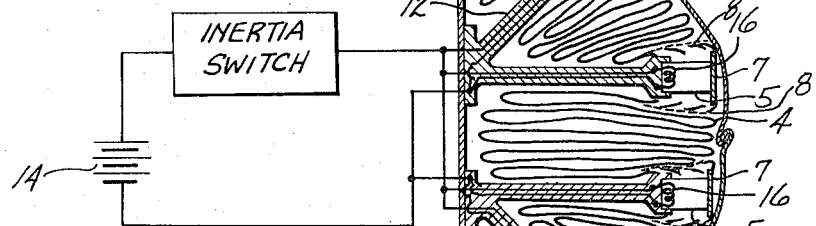
Fig. 2.
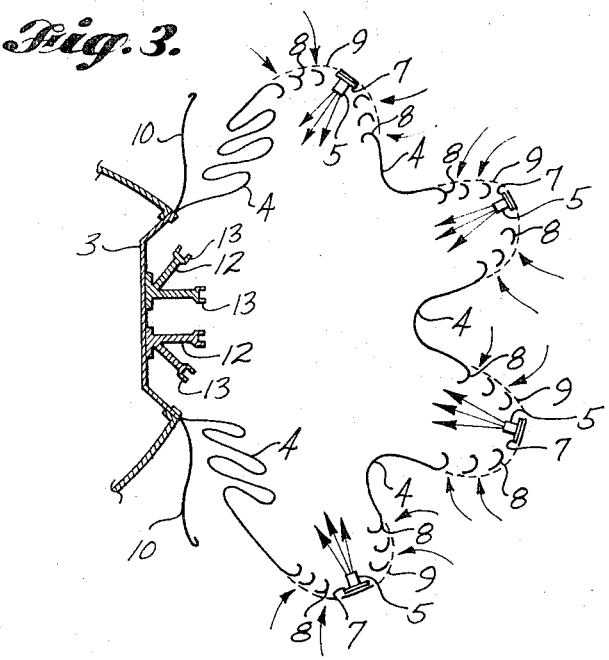
Fig. 3.
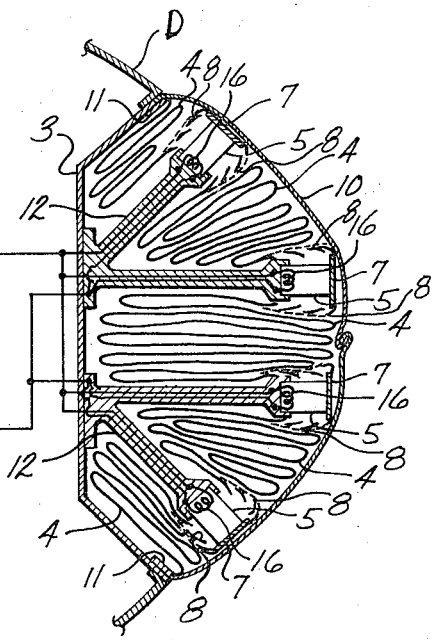
INVENTORS,
FOY McCULLOUGH, JR.
DUANE A. WILLIAMS
LINCOLN B. KATTER
DONALD R. POOLE
BY Grayled, Cole & Barnard
ATTORNEYS

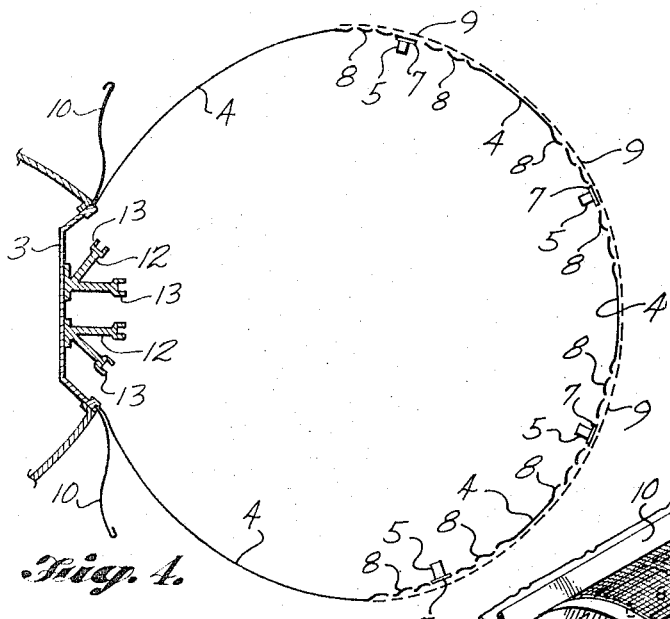
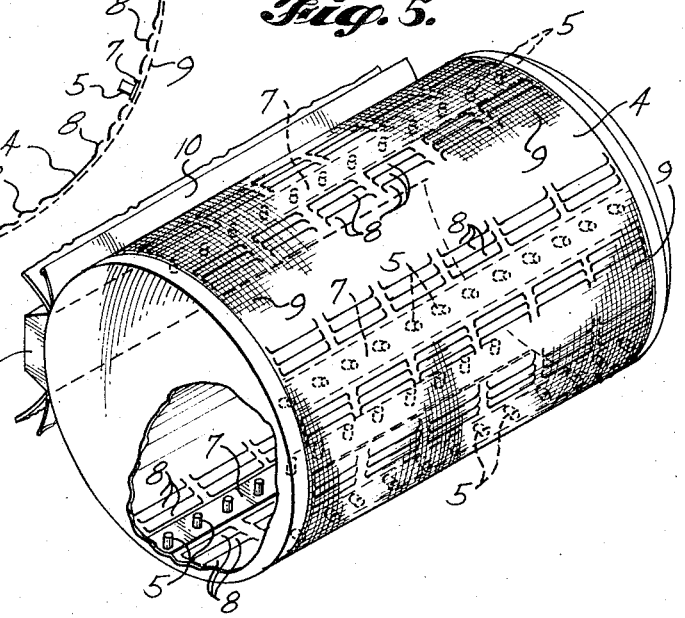
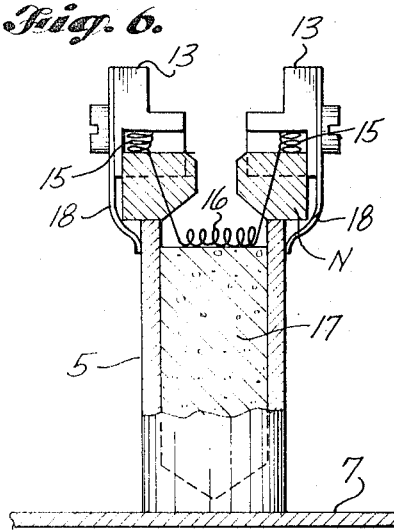
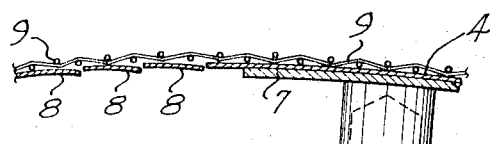
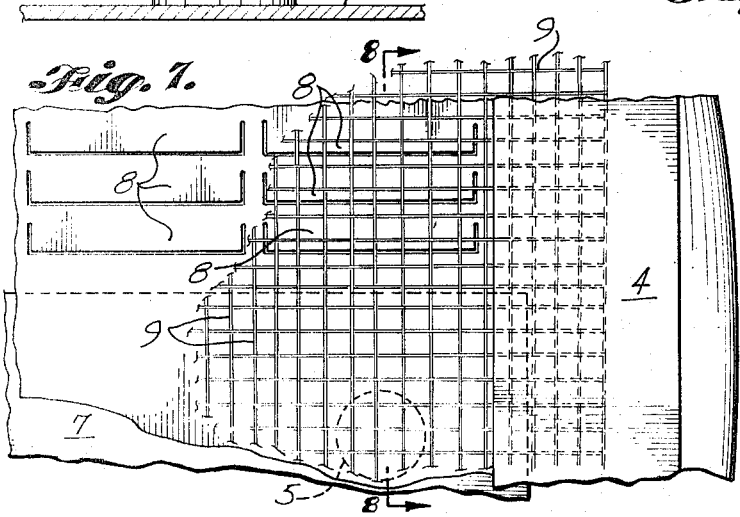

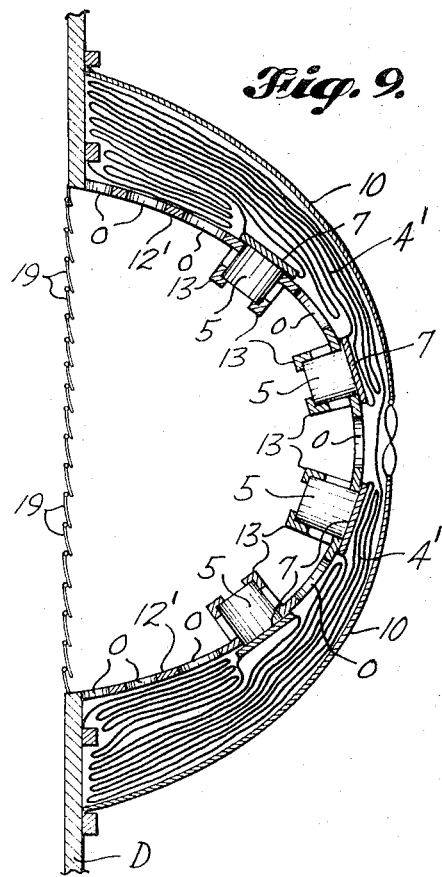
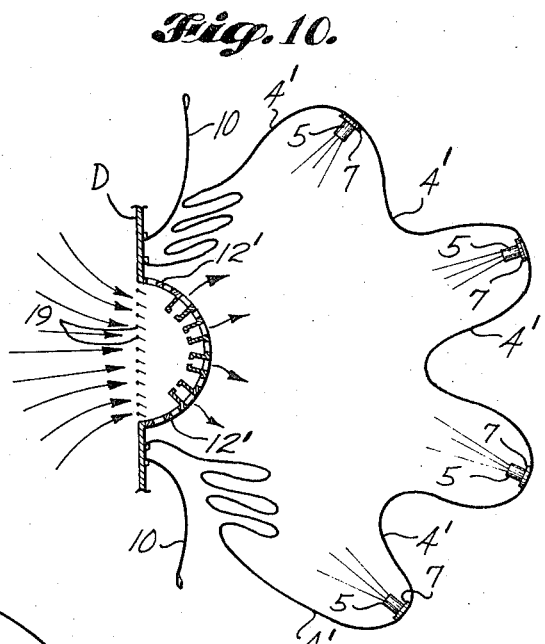
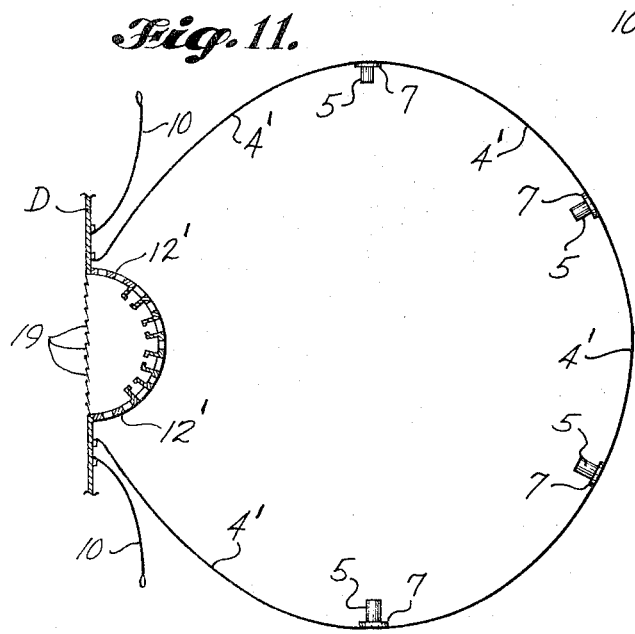
INVENTORS,
FOY McCULLOUGH, JR.
DUANE A. WILLIAMS
LINCOLN B. KATTER
DONALD R. POOLE
BY Grayseal, Cole & Barnard
ATTORNEYS INVENTORS,
FOY McCULLOUGH, JR.
DUANE A. WILLIAMS
LINCOLN B. KATTER
DONALD R. POOLE BY Graybeal, Cole & Barnard

ATTORNEYS

CRASH PROTECTION BAG AND INFLATION EQUIPMENT AND COMPONENTS THEREOF

BACKGROUND OF THE INVENTION

1. Field of the Invention

This invention relates to inflatable bags for restraining an occupant of a vehicle against movement during a collision, to a method of deploying such a bag, and to various component parts of the apparatus used which have general utility.

2. Description of the Prior Art

Inflatable bags for restraining movement of an occupant of a vehicle during a collision are known. In use such bags are rapidly inflated in response to a collision condition signal and when inflated fills the space between the occupant and a forward structural part of the vehicle, to resist substantial movement of the occupant during the collision. Examples of crash restraint systems are shown by U.S. Pat. No. 3,477,740, issued on Nov. 11, 1969 to David P. Hass, by U.S. Pat. No. 3,460,853, granted on Aug. 12, 1969 to Richard Chute, by U.S. Pat. No. 3,473,824, granted on Oct. 21, 1969 to William R. Carey and David P. Hass, and by U.S. Pat. No. 3,481,625, granted on Dec. 2, 1969 to Richard Chute. The contents of these four patents are hereby incorporated herein by this specific reference, to serve as background information for the present invention.

SUMMARY OF THE INVENTION

According to the present invention, a plurality of small thrusters, or a plurality of elongated tube type thrusters, are used for rapidly deploying the crash resistant bag. One aspect of the invention involves incorporating check valves in the bag wall so that during deployment some of the ambient air in the occupant compartment of the vehicle is "rammed" into the bag. An advantage of this arrangement is that the ambient air can be used as the major gas constituent for bag inflation, thereby minimizing the quantity of stored gas or gas generation chemical required. Excess gas from the thrust sources may be used to obtain a positive gage pressure in the bag after its full deployment. The check valves prevent escape of gas from the bag during this pressurization phase.

Another aspect of the invention involves mounting the bag on a wall portion of the vehicle forwardly of the occupant about an ambient air opening which includes check valves for permitting flow of air into but not out from the bag. During operation, the check valves are opened and ambient air is drawn into the bag as a result of a partial vacuum created in the bag during its deployment. The thrusters may also be used in this style of system for deploying the bag, and for pressurization of the bag to a positive gage pressure after complete filling has been achieved.

In addition to the above concepts the present invention relates to various specific parts of the bag and its deployment apparatus, including components (e.g., the thrusters) and subcombinations (e.g., the thrusters in combination with a fabric wall to be moved) which may also have utility for other applications.

BRIEF DESCRIPTION OF THE DRAWING FIGURES

FIG. 1 is a fragmentary side elevational view of an automobile, with a forewall portion thereof cut away, such view showing a crash restraint bag in a deployed condition and occupying a substantial amount of the space between an occupant in the front passenger seat on the right side of the driver and the dashboard of the vehicle;

FIG. 2 is an enlarged scale cross-sectional view taken through the stowed crash restraint bag package and a portion of the dashboard of the vehicle, such view including a simple control circuit for the thruster igniters;

FIG. 3 is generally the same type of view as FIG. 2, but on an enlarged scale and showing the bag in a partially deployed condition and omitting the ignition circuit;

FIG. 4 is a view like FIG. 3, but showing the bag fully distended;

FIG. 5 is a top isometric view of the bag in its distended condition, showing a typical pattern of check valves and thrusters, with an end wall portion of the bag cut away to show the thrusters and the check valves as they appear from the inside of the bag;

FIG. 6 is a view partially in side elevation and partially in section of one of the thrusters;

FIG. 7 is a fragmentary side elevation view looking toward the outer surface portion of the bag which faces the occupant, and showing one construction of the bag and its ambient air admitting check valves;

FIG. 8 is a sectional view taken through the bag wall substantially along line 8—8 of FIG. 7;

FIG. 9 is a view similar to FIG. 2, but of a modified form of restraint bag package, and minus the ignition circuit;

FIG. 10 is a view like FIG. 3, but relating to the bag form of FIG. 9;

FIG. 11 is a view like FIG. 4, but of the bag form of FIGS. 9 and 10;

Figure 12:
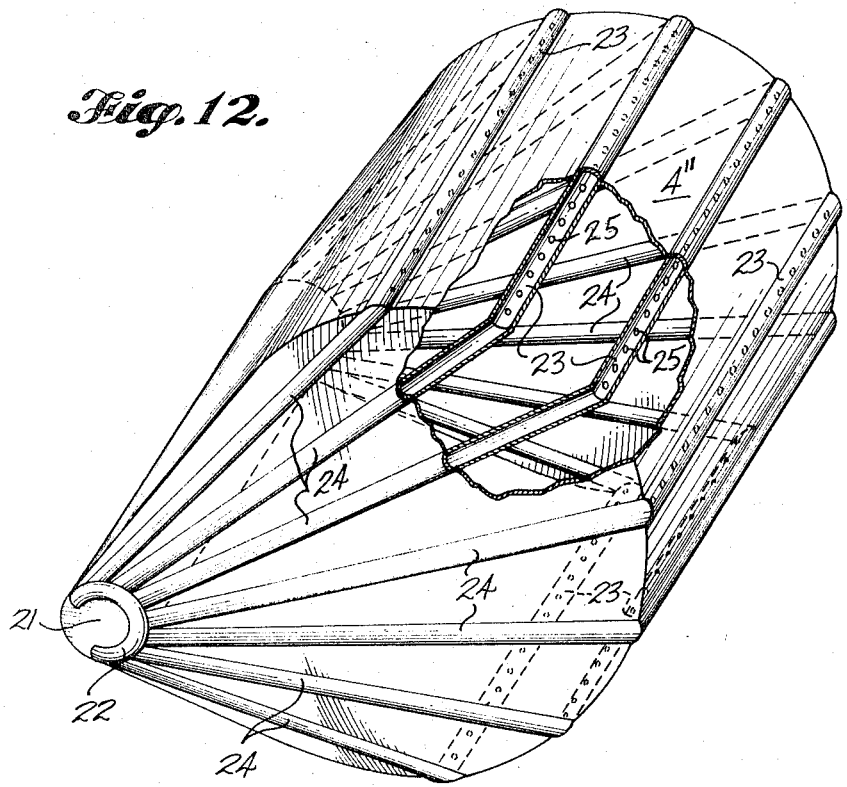
Figure 13:
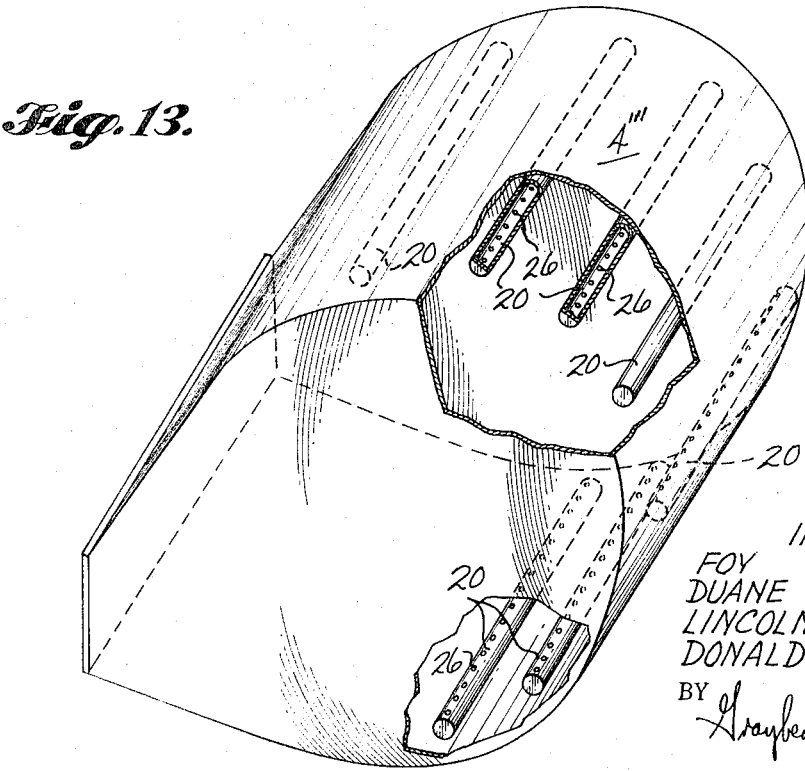

FIG. 12 is a top isometric view of another modified form of restraint bag, in its distended condition, with a foreground wall portion of the bag cut away for the purpose of showing elongated tube type thrusters and elongated inflatable feed passageways for the thrusters which are incorporated into the bag wall; and FIG. 13 is a view like FIG. 12, but of yet a still further form of restraint bag, characterized by a plurality of elongated thrusters secured to the inside of the bag.

The thrusters are shown diagrammatically in all figures in which they appear with the exception of FIGS. 6 and 8.

DESCRIPTION OF THE ILLUSTRATED EMBODIMENTS

By way of typical and therefore nonlimitive example, the crash restraint bag systems of the present invention are shown to be mounted within the automobile dash D forwardly of the front seat passenger position on the right side of the steering wheel (not shown). It is to be understood that with appropriate modification the basic concepts of the systems could be used in a steering wheel mounted bag, or in a bag provided for protection of rear seat passengers. For rear seat use the bag would be mounted on the backside of the front seat.

In FIG. 1 an occupant 2 is shown sitting on the passenger side of the front seat FS of an automobile 1. The dashboard D includes a recess or well 3 in which the inflatable restraint bag 4 is partially stored in a folded, inactive condition. A plurality of solid propellant thrusters 5 are connected to mounting strips 7 which are secured to inner surface portions of the bag wall.

The bag is made of a strong, lightweight fabric material such as nylon. In the embodiment of FIGS. 1-8 approximately one third of the bag surface which faces the passenger acts as a flexible check valve. As shown best by FIGS. 5, 7 and 8, a plurality of flap type check valves are incorporated or built into the bag wall laterally outwardly of each row of thrusters 5. The check valves may comprise a plurality of flaps 8 cut in the bag wall material. These flaps 8 are formed by making cuts on three sides of a rectangle (e.g. about ⅛ inch length cuts at the ends and about an 1 and ½ inch length cut along the cuts side), with the fourth side of the rectangle left uncut to serve as a hinge for securing the flap 8 to the bag proper. A high strength (e.g., nylon) net material 9, or some other pervious material characterized by a high percentage of open area, is attached to the outer surface of the bag 4 to overlie the flaps 8 and prevent their outward swinging movement in response to pressure within the bag 4. The mesh material 9 follows the regular contour of the bag's main wall (shown in FIGS. 4 and 5 as a cylindrical wall) and prevents outward movement of the flaps 8 beyond such wall contour.

When the bag 4 is in its stowed position within the recess 3 it is preferably covered by a fabric member 10 which may have a decorative outer surface. This fabric cover 10 is designed to part or otherwise open and move out of the way of the bag in response to bag movement towards its distended condition. In FIG. 2 the bag 4 is shown to be secured to the dashboard D at the upper and lower forward boundaries 11 of the recess 3. The bag is similarly secured at its two ends.

In the embodiment of FIGS. 1-8 a plurality of thruster support members or brackets 12 are secured to the vertical wall of the recess 3 and project forwardly therefrom towards the occupant 2. These supports 12 are vertically spaced from each other and from the upper and lower boundaries of the recess 3, so as to form a cavity both above and below each support member 12 in which radial folds of the collapsed bag 4 are received.

As best shown by FIG. 6, the supports 12 include sockets for the thrusters 5. A pair of bus bars 13 is provided on the supports 12 for each thruster 5. One of the bus bars 13 is connected by wiring to the negative terminal of a battery 14 and the other bus bar 13 is connected by wiring to the positive terminal of the battery 14. An inertia switch or other collision condition sensor is included in the circuit and is normally open.

The thruster 5 shown by FIG. 6 comprises a tubular housing containing a solid propellant body 17 or the like and a nozzle portion N secured to the housing. A resistance type ignition member 16 is shown to be incorporated within the nozzle member N, and to include a propellant igniting center portion and two end portions which lead through the nozzle member N to coil spring type contacts 15. When a thruster 5 is on its support 12 its contacts 15 are in contact with the bus bars 13. Leaf spring type clips or retainers 18 may be provided on the supports for initially, but releasably, securing the thrusters 5 to the supports 12.

As best shown by FIG. 5, several rows of thrusters 5 are secured to the inside of the bag 4, and each row of thrusters 5 is mounted onto a mounting strip 7 which is in turn secured to the bag wall material.

The thrusters are designed to provide ignition within approximately 1 msec of a command signal from the inertia switch or other crash sensor. The propellant composition and configuration, and the thruster configuration, are designed to provide a thrust duration of approximately 20–30 msec and a combined impulse of approximately 4 lbf-sec. Of course, the value of impulse required is a function of bag size and mass as well as check valve characteristics, so that the values stated here should be considered only as indicating an order of magnitude.

From the standpoint of simplicity the number of thrusters should be kept at a minimum. However, there must be a sufficient number of thrusters to assure a fairly uniform force and mass distribution over the bag surface during deployment. If this is done, there is no risk of passenger injury due to high local force or momentum values at the thruster locations.

The multiple orifices provided when the flaps 8 open not only permit ram air to enter into the bag 4, but result in a rapid deployment of the bag due to a reduction in air pressure resistance to bag deployment within the vehicle.

It is to be noted that the open side of each flap 8 always faces the nearest row of thrusters 5, permitting the flow patterns diagramed in FIG. 3. The fabric check valves are positioned such that they lie flat and in a closed position during bag storage.

Upon ignition the gas initially produced by the thrusters 5 causes pressurization of the limited volume available within the bag while it is in its packaged condition. This pressurization along with the thrust produced by the thrusters causes the release of the thrusters 5 from their mounting members and also forces open the protective cover 10. As the bag moves outwardly to its deployed or distended condition the check valves are open and the thrusters are accelerating the bag outwardly, causing ambient air within the vehicle to be "rammed" through the unchecked orifices and into the bag 4. In addition to this a ram effect there may be some pumping action induced by an aspirator like action, due to the location and arrangement of the louvered openings relative to the thrusters 5.

FIG. 4 shows the bag in its fully distended or deployed condition. The inertia of the flexible check valve flaps 8, along with the pressurization caused by the gases exhausted from the thrusters after the bag motion has slowed down, causes the flaps 8 to close and occupy the positions shown in FIGS. 7 and 8.

As in the case of conventional crash restraint bags, the bag 4 should include a suitably placed vent orifices (not shown) which will allow the bag to deflate in a controlled fashion upon impact from the passenger 2.

In the embodiment of FIGS. 9–11 the recess 3 and the bracket type supports 12 are replaced by a semicylindrical support member 12' which includes thruster sockets flanked by bus bars 13 of the same type shown by FIG. 6, and some additional air admitting openings O. In this embodiment the bag folds are in juxtaposition with each other and with the support 12'. A large central air inlet air opening is provided in the dashboard D, and is equipped with a plurality of louver-like check valve members 19. These members 19 may be constructed from rigid sheet aluminum and designed so that they are in an overlapping closed position both when the bag 4' is packaged and when it is pressurized, and to open for the purpose of permitting air flow in to the bag 4' during deployment of the bag 4'.

In operation, the thrusters 5 are simultaneously electrically ignited in response to a signal from a crash condition sensor (e.g., an inertia switch). The gas pressure created after ignition combined with the thrust would cause opening of the protective cover and initiate acceleration of the bag and its attached thrusters. During the early portion of the burn a positive gage pressure exists in the bag because of rapid gas generation combined with relatively low deployment velocities. During this first stage the louver check valve members 19 remain closed. When the bag 4' is in the partially deployed position shown by FIG. 10 the velocity and high rate of volume change causes the bag to act as a piston pump and the pressure inside the bag 4' drops below ambient pressure. In response, the louver check valve members 19 open and ambient air flows from within the passenger compartment into the bag 4'. This air flows from the passenger compartment up under the dashboard D to the louver inlet. Once the bag is fully deployed its motion, and hence the pumping action, are stopped. The continued generation of gases by the thrusters causes a positive pressure to develop in the bag and forces the louver check valves to close. As in the earlier design, a vent (not shown) can be provided in the bag or incorporated into the louver design, to cause deflation of the bag 4' upon passenger impact with it.

In some installations it might be desirable to combine together the louver check valve controlled inlet opening of FIGS. 9-11 and the bag check valves shown by FIGS. 1-8. In such a combined design it would probably be more advantageous to locate the bag check valves near the base of the bag rather than near the thrusters.

FIGS. 12 and 13 diagrammatically illustrate additional forms of crash restraint bags which are thruster deployed. In the embodiment shown by FIG. 12 a central gas source 21 is used. It may be a compact cool gas generator, or merely a vessel of stored gas. The inflation gas is released from the source 21 into a manifold 22. It flows from the manifold 22 radially outwardly through a radial feeder passageways 24 which are flexible tubes incorporated within the end walls of the bag 4''. The feeder tubes 24 feed into lateral tubes 23 having radially inwardly discharging openings, some of which are designated 25. Gas flow through the tubes 24 tends to stiffen them and this itself aid deployment of the bag. The tubes 23 function as elongated thrusters when the pressurized gas discharges through the openings 25. Although radial inflatable tubes are illustrated, it is to be understood that circumferential tubes, or a combination of radial and circumferential tubes, could be used as well.

FIG. 13 is also somewhat diagrammatical. In this embodiment the bag 4''' is equipped with a plurality of elongated thruster units 20. Each thruster unit 20 includes a plurality of outlet openings, some of which are designated 26. These thrusters 20 may include a solid propellant which is suitably ignited by electrical ignition means, similar to the earlier described thrusters. Or, the units 20 may be pressurized gas storing vessels, the outlet openings 26 of which are closed by an explosive strip valve or the like, so that energization of the valve in response to a collision condition signal would cause an opening of the openings 26, and allow the stored gas to escape from the vessels 20, producing a bag deployment reaction force.

It should be apparent from the above, that new and improved vehicle safety apparatuses have been provided hereby, and that certan modifications, changes, and adaptions may be made therein. It is intended to cover all such modifications, changes, and adaptations which come within the scope of the appended claims.

The term "fabric" is used herein to describe any type of sheet or multi-sheet material, and besides cloth includes plastics and other natural and synthetic materials.

What is claimed is:

1. A fabric wall and a thruster connected to said wall, said thruster having an outlet opening directed away from said wall, and a source of motive fluid for discharging from said thruster through said outlet opening, to produce a reaction force for positively moving said wall, said fabric wall including openings therein through which ambient air may pass during movement of the wall, with at least some of the openings being closely adjacent the thruster so that the ambient air flowing therethrough is influenced by the low pressure created by the thruster gas stream.

2. In combination, a support member, an object to be moved away from said support member means interconnecting said member and said object but permitting a predetermined amount of movement, and a thruster connected to said object for causing its movement, said thruster having an outlet opening directed away from said object, and said thruster being initially supported by the support member, and a source of motive fluid for discharging from said thruster through said outlet opening, to produce a reaction force for moving said object away from the support member, said thruster including a chamber containing a body of solid propellant, an electrical ignition element having two electrical contacts disposed towards said support member and a propellant igniting portion in igniting proximity with the solid propellant, and wherein said support member includes two electrical terminals which are in contact with the electrical contacts of the thruster when the thruster is on the support, and from which the ignition element receives electrical energy for its operation.

3. Apparatus according to claim 2, wherein said support member includes spring retainers for initially, but releasably, connecting the thruster to the support member.

4. An inflatable bag member having a fabric wall, and a plurality of thrusters connected to said wall, said thrusters each having an outlet opening directed to discharge into said bag, and a source of motive fluid for discharging from each said thruster through its outlet opening, to produce a reaction force for moving the bag wall from a relaxed condition towards a distended condition; and support wall means comprising a plurality of spaced apart support members for the thrusters defining cavities between them, whereby the bag wall may be folded and stored in said cavities when the thrusters are on the supports.

5. Apparatus according to claim 4, wherein the bag is folded into radial folds, said folds are in said cavities, and said thrusters are on the supports.

6. Apparatus according to claim 4, wherein the bag wall includes openings spaced from the thrusters for admitting ambient air during thruster operation and bag wall movement.

7. Apparatus according to claim 6, wherein said bag wall includes check valves for said openings, adapted to open inwardly of the bag and close against pressure within the bag.

8. Apparatus according to claim 6, wherein said check valves comprise flaps in said wall which are free to swing inwardly from the bag wall, and a pervious member connected to said wall and overlying the flaps on the outer side of the bag, for substantially restraining the flaps against outward swinging movement.

9. An inflatable bag member having a fabric wall connected to a support, means for moving the bag wall from a relaxed condition adjacent said support towards a distended condition, said bag wall including openings therein for admitting ambient air by ram effect during bag wall movement, said bag wall including check valves for said openings, adapted to open inwardly of the bag and close against pressure within the bag, said check valves comprising flaps in said wall which are free to swing inwardly from the bag wall, a pervious member connected to said wall and overlying the flaps on the outer side of the bag, for substantially restraining the flaps against outward swinging movement.

10. In a bag deployment system, a thruster support member, and a thruster connected to said bag releasably mounted on said support member, said thruster including a chamber containing a body of solid propellant, an electrical ignition element having two electrical contacts disposed towards said support member and a propellant igniting portion in series between said contacts, and in igniting proximity with the solid propellant, said support member including two electrical terminals which are in contact with the electrical contacts of the thruster when the thruster is on the support, and from which the ignition element receives electrical energy for its operation.

11. Apparatus according to claim 10, wherein said support member includes spring retainers for initially, but releasably, connecting the thruster to the support member.

12. A vehicle safety device for protecting an occupant of a vehicle during a collision comprising an inflatable bag having a collapsed inoperative condition and a distended operative condition in which it is disposed for receiving the impact of the occupant thereagainst during the collision, said inflatable bag having a fabric wall, bag deployment means for moving the bag wall from its inoperative towards its operative condition, said bag wall including openings therein for admitting ambient air during bag wall movement, and check valves for said openings, adapted to open inwardly of the bag and close against pressure within the bag, said check valves comprising flaps in said wall which are free to swing inwardly from the bag wall, and a pervious member connected to said wall and overlying the flaps on the outer side of the bag, for substantially retaining the flaps against outward swinging movement.

* * * * *